United States Patent
Scully et al.

(10) Patent No.: US 8,925,322 B2
(45) Date of Patent: Jan. 6, 2015

(54) FUEL SUPPLY SYSTEM

(75) Inventors: Mark Scully, Derby (GB); Arthur Laurence Rowe, Derby (GB)

(73) Assignee: Rolls-Royce PLC, London (GB)

( * ) Notice: Subject to any disclaimer, the term of this patent is extended or adjusted under 35 U.S.C. 154(b) by 1506 days.

(21) Appl. No.: 12/073,438

(22) Filed: Mar. 5, 2008

(65) Prior Publication Data
US 2008/0271456 A1    Nov. 6, 2008

(30) Foreign Application Priority Data
May 4, 2007   (GB) .................................. 0708745.5

(51) Int. Cl.
| | |
|---|---|
| F02C 1/00 | (2006.01) |
| F02C 7/228 | (2006.01) |
| F02C 7/236 | (2006.01) |
| F02C 9/26 | (2006.01) |
| F02C 9/34 | (2006.01) |
| F23K 5/04 | (2006.01) |
| F02C 7/22 | (2006.01) |

(52) U.S. Cl.
CPC ................ *F02C 7/228* (2013.01); *F02C 7/236* (2013.01); *F02C 9/263* (2013.01); *F02C 9/34* (2013.01); *F23K 5/04* (2013.01); *F02C 7/222* (2013.01); *F23K 2301/206* (2013.01); *F05D 2270/3015* (2013.01)
USPC .............................................. 60/734; 60/739

(58) Field of Classification Search
CPC ............... F02C 7/22; F02C 7/232; F23R 3/28
USPC ............ 60/740, 734, 739, 39.24, 39.281, 790
See application file for complete search history.

(56) References Cited

U.S. PATENT DOCUMENTS

| | | | |
|---|---|---|---|
| 2,688,841 A | * | 9/1954 | Stein et al. .................. 60/39.281 |
| 3,834,160 A | * | 9/1974 | Moehring et al. .............. 60/243 |
| 4,344,280 A | | 8/1982 | Minakawa et al. |

(Continued)

FOREIGN PATENT DOCUMENTS

| | | |
|---|---|---|
| EP | 1 553 344 A3 | 7/2005 |
| GB | 2 324 855 A | 11/1998 |
| JP | A 10-306924 | 11/1998 |

OTHER PUBLICATIONS

European Search Report dated Feb. 7, 2014 from European Patent Application No. 08 25 0751.

(Continued)

*Primary Examiner* — Gerald L Sung
(74) *Attorney, Agent, or Firm* — Oliff PLC

(57) ABSTRACT

A turbine fuel supply system is disclosed as including a first sub-system having: a first nozzle for injecting fuel into a combustor of a turbine engine; a first valve controllable to communicate fuel to the first nozzle; and a first fuel manifold for communicating fuel to the first valve from a fuel source; the system further including a controller assembly for raising the pressure of fuel in the first fuel manifold; and the system being characterized in that the first valve is adapted to open in response to a predetermined pressure difference between the first fuel manifold and the pressure in the combustor, thereby allowing fuel to be communicated from the first fuel manifold to the first nozzle. The system may include a first recirculating conduit in fluid communication with the first fuel manifold and the fuel source, the first recirculating conduit allowing fuel not communicated by the first valve to be returned to the fuel source.

22 Claims, 9 Drawing Sheets

(56) References Cited

U.S. PATENT DOCUMENTS

| | | | | |
|---|---|---|---|---|
| 4,932,205 A | * | 6/1990 | Alderfer et al. | 60/39.091 |
| 5,094,666 A | * | 3/1992 | Feldman et al. | 44/388 |
| 5,168,698 A | | 12/1992 | Peterson et al. | |
| 5,187,936 A | * | 2/1993 | Kast et al. | 60/734 |
| 5,321,949 A | * | 6/1994 | Napoli et al. | 60/739 |
| 5,365,732 A | * | 11/1994 | Correa | 60/39.281 |
| 5,402,634 A | * | 4/1995 | Marshall | 60/776 |
| 5,442,922 A | | 8/1995 | Dyer et al. | |
| 5,513,493 A | * | 5/1996 | Severn et al. | 60/39.281 |
| 5,528,897 A | * | 6/1996 | Halin | 60/39.094 |
| 5,735,117 A | * | 4/1998 | Toelle | 60/39.094 |
| 5,809,771 A | * | 9/1998 | Wernberg | 60/39.094 |
| 6,176,076 B1 | * | 1/2001 | Ford | 60/39.281 |
| 6,334,296 B2 | * | 1/2002 | Futa et al. | 60/778 |
| 6,955,040 B1 | | 10/2005 | Myers, Jr. et al. | |
| 7,036,302 B2 | | 5/2006 | Myers, Jr. et al. | |
| 2003/0037536 A1 | * | 2/2003 | Aoyama | 60/39.281 |
| 2003/0093184 A1 | * | 5/2003 | Tanaka | 700/289 |
| 2004/0083711 A1 | | 5/2004 | Hodinot et al. | |
| 2005/0198964 A1 | * | 9/2005 | Myers et al. | 60/739 |
| 2005/0217269 A1 | * | 10/2005 | Myers et al. | 60/739 |

OTHER PUBLICATIONS

Oct. 13, 2014 Office Action issued in European Patent Application No. 08250751.8-1602.

* cited by examiner

FUEL SUPPLY SYSTEM

The present invention relates to a fuel supply system suitable for a multi-stage combustor, in particular a multi-stage combustor of a gas turbine engine.

There are a number of known fuel supply systems for staged gas turbine combustion systems. For example, U.S. Pat. No. 7,036,302 discloses a multi-stage gas turbine engine fuel supply system including a plurality of fuel injectors and at least first and second stage fuel injection circuits in each of the fuel injectors. Each of the first and second stage fuel injection circuits has first and second fuel injection points and at least first and second fuel nozzle valves controllably connected to the first and second staged fuel injection circuits, respectively.

A fuel supply circuit includes a single fuel supply manifold connected in fuel supplying relationship to all of the fuel nozzle valves. The first and second fuel nozzle valves are operable to open at different first and second crack open pressures, respectively, and all of the first and second fuel nozzle valves are controllably connected to a single fuel signal manifold in a signal circuit. The signal circuit includes a signal fuel return line leading from the fuel signal manifold to a signal fuel return inlet to a fuel pump.

The system further includes a pressure difference measuring means for sensing a pressure difference between a signal pressure of the signal circuit and a fuel supply pressure of the fuel supply circuit.

A fuel controller in feedback signal relationship to the pressure difference measuring means controls a pressure regulator controllably connected to a fuel controller. The fuel controller, by controlling the pressure regulator, controls and regulates pressure through the signal circuit and, thus, controls the crack open pressures sent to the fuel nozzle valves from the single fuel signal manifold in the signal circuit.

The first fuel nozzle valves open and remain open when the pressure in the signal circuit equals or exceeds the first crack open pressure. The second fuel nozzle valves open and remain open when the pressure in the signal circuit equals or exceeds the second crack open pressure. This allegedly eliminates the need for multiple fuel and signal lines to each injector for each stage.

As can be seen, U.S. Pat. No. 7,036,302 relies on sophisticated valve technology to achieve the staging control. Examples of the valves are shown in FIGS. 13 to 16 of U.S. Pat. No. 7,036,302. However, the valves are located close to the hostile environment of the burner of the gas turbine. As a consequence, such valves may be prone to failure, or at least will be subject to frequent maintenance checks to ensure safe and effective operation is maintained in view of their relative sophistication. Similar valves are disclosed in U.S. Pat. No. 6,955,040.

A similar valve is also disclosed in U.S. Pat. No. 5,442,922, where the nozzle shut-off valves are controllable via a separate signal pressure line.

For instance, it is disclosed that each shut-off valve includes a spring-biased valve member, located between an inlet port and an outlet port, which is normally biased in the open position. The backside of each shut-off valve is coupled to a branch of the signal pressure line to receive high pressure fuel, and in turn drive the respective valve member into a closed position.

U.S. Pat. No. 5,442,922 discloses that such valves are included in a fuel staging system in which metered fuel from a fuel metering unit is directed into a fuel inlet line coupled to a sequence valve. The signal pressure line is also supplied by the sequence valve.

A main fuel manifold is coupled downstream of the sequence valve, and a plurality of main fuel nozzles are each coupled to the main fuel manifold through a respective main nozzle shut-off valve.

A first set of pilot nozzles is coupled to the main fuel manifold through the sequence valve, and a second set of pilot nozzles is also coupled to the main fuel manifold through the sequence valve.

At low engine speeds, in the first and/or second pilot open positions, fuel flows to either pilot nozzle through the main fuel manifold, and the main fuel nozzles are isolated from the main fuel manifold by the main nozzle shut-off valves.

Then, at higher engine speeds, the main nozzle shut-off valves are opened, and the sequence valve splits the fuel flow from the fuel inlet line between the main fuel manifold and the first and second pilot nozzles. The fuel in the main fuel manifold flows to the main fuel nozzles, and the remainder of the fuel split off by the sequence valve flows to the first and second pilot nozzles.

Again, the nozzle shut-off valves are likely to be positioned close to the hostile burner environment, and therefore are likely to suffer from similar problems to that outlined above in respect of the valves of U.S. Pat. No. 7,036,302.

Therefore, in general, an aim of the present invention is to provide a fuel supply system suitable for a turbine engine, e.g. a gas turbine engine, which overcomes the problems set forth above by providing a simple nozzle shut-off valve. Preferably, the valve is more easily controllable in that to open and/or close the valve, a signal line (e.g. an additional pressure line) is not required in addition to the fuel supply line.

In a first aspect, a turbine fuel supply system, e.g. a gas turbine fuel supply system, according to the present invention may include a first sub-system having: a first nozzle for injecting fuel into a combustor of a turbine engine; a first valve controllable to communicate fuel to the first nozzle; a first fuel manifold for communicating fuel to the first valve from a fuel source; and a controller assembly for raising the pressure of fuel in the first fuel manifold; characterized in that the first valve is adapted to open in response to a predetermined pressure difference between the first fuel manifold and the pressure in the combustor, thereby allowing fuel to be communicated from the first fuel manifold to the first nozzle.

The first valve is preferably a nozzle shut-off valve which ultimately controls the flow of fuel from the fuel supply system to the combustor of the turbine engine via the first nozzle.

Accordingly, the present invention preferably provides a fuel supply system having a valve, or a plurality of valves, which is controllable by modifying the pressure of fuel in the valve's fuel supply manifold relative to the combustor pressure. It is the pressure difference across the valve, i.e. the pressure difference between the fuel in the supply manifold and the pressure in the combustor, which determines whether the valve opens or closes (or remains in one of these states). No additional signal pressure line to the or each valve is necessary. Complex valves are also not essential. Active feedback from the valve is unnecessary for controlling the valve.

A system according to the present invention preferably includes a plurality of sub-systems as described above. For example, the turbine fuel supply system may further include a second sub-system including: a second nozzle for injecting fuel into the combustor of the turbine engine; a second valve controllable to communicate fuel to the second nozzle; a second fuel manifold for communicating fuel to the second valve from the fuel source; wherein the controller assembly is capable of raising the pressure of fuel in the second fuel manifold; and wherein the second valve is adapted to open in response to a predetermined pressure difference between the second fuel manifold and the pressure in the combustor, thereby allowing fuel to be communicated from the second fuel manifold to the second nozzle.

To avoid repetition, it is stated here that the description of components of the first sub-system can equally be applied to equivalent components of all the other sub-systems described.

A system according to the present invention may include a sensor for sensing the pressure in the combustor, e.g. in the region downstream of a nozzle. The system may include pressure difference determination means for determining the difference in pressure between the or each fuel manifold and the combustor, e.g. as sensed by the sensor.

The controller assembly may be controllable on the basis of the determination of the pressure difference determination means.

A valve of an un-staged sub-system is therefore able to prevent the flow of fuel from the respective fuel manifold to the combustor via a nozzle associated with the valve.

Here, we define an un-staged sub-system as a sub-system in which fuel in the fuel (supply) manifold is not communicated, via the or each nozzle of the sub-system, to the combustor of the turbine engine. In other words, it is a sub-system in which the or each nozzle shut-off valve of the sub-system is closed. We also define a staged-in sub-system as a sub-system in which fuel in the fuel (supply) manifold is communicated, via the or each nozzle of the sub-system, to the combustor of the turbine engine. In other words, it is a sub-system in which the or each nozzle shut-off valve of the sub-system is open.

However, when a sub-system of a fuel supply system is un-staged, fuel may stagnate in the fuel passages, such as the fuel manifold, and the fuel may be subject to heat soakage from the high temperatures at the core of the engine. This may subsequently lead to degradation of the fuel.

Fuel degradation caused by high temperatures can result in coking, which can form deposits in the fuel passages, thereby causing blockages and hence loss of function.

Therefore, a fuel supply system according to the present invention may include a first recirculating conduit in fluid communication with the first fuel manifold and the fuel source, the first recirculating conduit allowing fuel not communicated by the first valve to be returned to the fuel source. The first recirculating conduit preferably forms a portion of the first sub-system. Each sub-system may include a respective recirculation conduit.

Thus, in all operating modes fuel may flow in the or each sub-system, regardless of whether the sub-system is staged-in or un-staged, i.e. regardless of whether fuel is communicated to the combustor region of the turbine engine by the or each sub-system. Rather, the or each un-staged sub-system can be cooled by recirculating fuel. Furthermore, a flow of fuel can be maintained in the or each sub-system, e.g. in the or each fuel manifold, to allow for rapid transitions between each staging mode with no adverse effect on engine operability.

Preferably, the controller assembly includes a controllable first pressure regulator associated with the first sub-system. The first pressure regulator may be adjustable to restrict the flow of recirculated fuel in the first recirculating conduit, thereby regulating the fuel pressure in the first fuel manifold. The first pressure regulator is preferably adapted to maintain the fuel pressure in the first manifold to be equal to or above the combustor pressure. The first pressure regulator may maintain the fuel in the first manifold at a pressure which is less than the crack pressure of the or each first nozzle when the sub-system is un-staged. The first pressure regulator may be provided downstream of the first recirculating conduit, e.g. between the first recirculating conduit and the fuel source.

Each sub-system may be provided with an equivalent pressure regulator, or the first pressure regulator may be adapted to regulate the pressure in the manifold of each sub-system.

The controller assembly may be provided with a flow regulator. The flow regulator may be controllable to maintain a fixed flow rate of fuel in the or each recirculating conduit. The flow regulator may be provided as an alternative to the pressure regulator.

A flow restrictor for restricting the flow of fuel may be provided between the fuel source and the or each nozzle of an un-staged sub-system. A respective flow restrictor may be provided for each un-staged sub-system.

One or more flow controllers may be included in the fuel supply system to control the flow of fuel from the fuel source to the or each fuel manifold. The flow controller may be in communication with the controller assembly. The or each flow controller may include a valve. At least one of the flow controller valves may be adapted to variably distribute an inflow of fuel between a plurality of fuel exit lines, e.g. coupled to respective fuel manifolds. At least one of the flow controller valves may be a switch valve, which allows or prevents the flow of fuel to one or more fuel manifolds.

One or more of the flow controller valves may be controllable to re-configure one or more recirculating conduits to make it into a fuel (supply) manifold, e.g. when the respective sub-system is staged-in.

A measurement assembly for determining the rate of flow of fuel into the or each fuel manifold may be provided. The measurement assembly may include a hydromechanical unit (HMU) and/or a flowmeter. A staged-in sub-system may be in fluid communication with the fuel source via such a measurement assembly. An un-staged sub-system may by in fluid communication with the fuel source via a route which circumvents the measurement assembly. Therefore, only the fuel communicated to a staged-in sub-system may be metered by the measured assembly.

Alternatively, or additionally, a meter may be provided to determine the rate of flow of fuel which is returned to the fuel source by the or each recirculating conduit. The net fuel usage, e.g. the amount of fuel burned in the combustor region and/or the rate of fuel burn, may be determined on the basis of the respective determinations of the measurement assembly and the or each meter. Such net fuel usage may be determined by the measurement assembly, by the meter or by other means.

Alternatively, the net fuel usage may be determined on the basis of the determination of the measurement assembly and the fixed flow rate of fuel in the or each recirculating as maintained by the flow regulator.

In a first fuel supply system according to the present invention, each of the sub-systems may include a respective recirculating conduit as described above. Each of the recirculating conduits may be arranged in "parallel" (as opposed to in "series") to recirculate fuel back to the fuel source.

The or each subsystem may include a respective recirculating conduit which is in direct fluid communication with the fuel source. Therefore, where a plurality of sub-systems is provided, each sub-system may include a fuel manifold for communicating fuel to the first valve from a fuel source, and may include a respective recirculating conduit for recirculating fuel back to the fuel source such that the recirculated fuel is not communicated via the recirculating conduit of a respectively different sub-system. The recirculating conduits may couple a respective fuel manifold to the fuel source.

One or more recirculating conduits of a staged-in sub-system may be configurable to allow fuel to be communicated to the or each valve, of a sub-system, from the fuel source, this may be controlled by one or more flow controllers. Therefore, when a sub-system is staged-in and practically all the fuel in the sub-system is communicated by the fuel manifold to the valve to be communicated to the nozzle (and thus practically no fuel would flow in the recirculating conduit back to the fuel source), a flow controller may reconfigure the recirculating conduit so that fuel is able to flow through the recirculating conduit from the fuel source to the valve.

An un-staged sub-system may not have the rate of fuel flow through it determined, because practically all the fuel will be recirculated back to the fuel source. Thus, the cooling flow of fuel through the or each un-staged sub-system can be kept separate from the metered flow delivered to the combustor of the turbine engine, e.g. as measured by the measurement assembly, thereby having no adverse effect on the fuel metering control loop.

In another fuel supply system according to the present invention, in which there are two (or more) sub-systems having respective first and second recirculating conduits, the conduits allow fuel not communicated to the first nozzle by the first valve, to be returned to the fuel source via a succession of both the first and second recirculating conduits, e.g. via the first recirculating conduit followed by the second recirculating conduit. In short, the recirculating conduits may be arranged to be in "series" with each another to recirculate the fuel back to the fuel source.

For example, in a fuel supply system according to the present invention having two or more sub-systems, fuel supplied by the first fuel manifold but not communicated to the first nozzle by the first valve may be allowed to recirculate back to the fuel source via a succession of a recirculating conduit of two or more of the respective sub-systems, preferably via a succession of a recirculating conduit of each of the respective sub-systems (e.g. via a first sub-system recirculating conduit followed by a second sub-system recirculating conduit followed by a third sub-system recirculating conduit—and so on in the case of four or more sub-systems).

However, at least a portion of a fuel manifold of one of the sub-systems may provide a means of fluid communication between a pair of recirculating conduits. It is not essential that recirculating conduits of respective sub-systems are directly physically coupled, only that they are arranged successively to allow fuel to be recirculated back to the fuel source, e.g. at least when one of the one or more sub-systems is un-staged.

The meter may be provided to determine the rate of flow of fuel recirculated back to the fuel source, e.g. by measuring the flow in the last recirculating conduit of such a series arrangement of successive conduits.

The first fuel manifold may include at least a portion of the primary fuel manifold and at least a portion of a primary recirculating conduit. The second fuel manifold may include at least a portion of the first fuel manifold and at least a portion of the first recirculating conduit.

Of course, a combination of series and parallel arrangements of the respective recirculating manifolds is also within the scope of the present invention. For example, the primary sub-system may be arranged in the "parallel" configuration, whereas the first and second sub-systems may be arranged in the "series" configuration.

Another general aim of the present invention is to provide a fuel supply system suitable for a turbine engine, e.g. a gas turbine engine, which allows fuel to flow through an un-staged stage, thereby helping to prevent fuel degradation and coking of fuel passages in the un-staged stage.

Accordingly, a fuel system according to the present invention may include a first sub-system having: a first nozzle for injecting fuel into a combustor of a turbine engine; a first valve controllable to communicate fuel to the first nozzle; a first fuel manifold for communicating fuel to the first valve from a fuel source; and a first recirculating conduit in fluid communication with the first fuel manifold and the fuel source, the first recirculating conduit allowing fuel not communicated by the first valve to be returned to the fuel source. A plurality of such sub-systems may provided.

Aspects and embodiments of the present invention will now be illustrated, by way of example, with reference to the accompanying figures in which, FIG. 1 shows a fuel supply system according to the present invention in pilot mode.

Further aspects and embodiments will be apparent to those skilled in the art.

Figure 1:
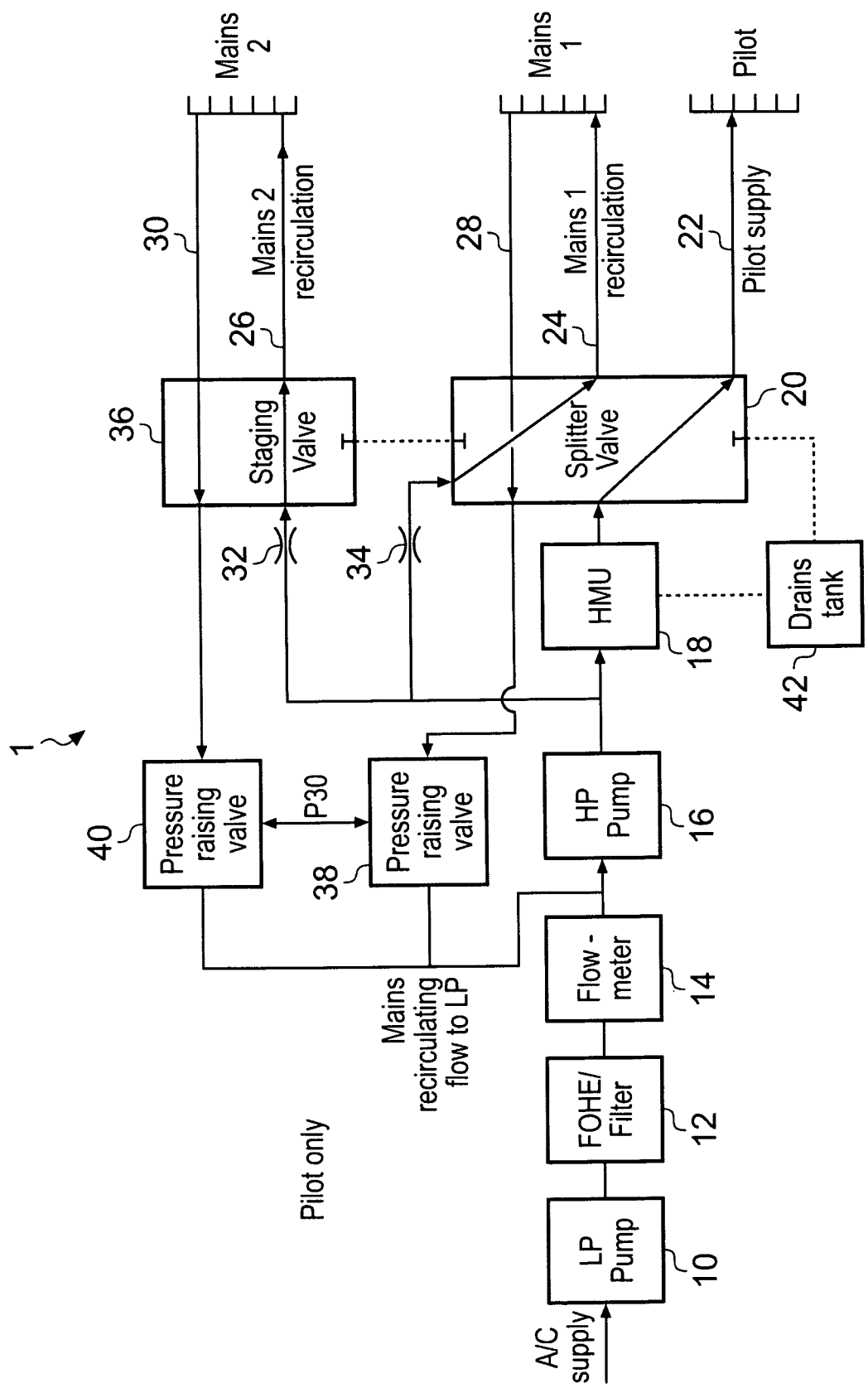

A first embodiment of a fuel supply system 1 according to the present invention is illustrated in FIGS. 1 to 4, in which the fuel supply system is connected to three stages of a gas turbine engine: pilot, mains 1 and mains 2. In FIG. 1 the gas turbine engine is in pilot mode—the pilot of the engine has been staged-in, but the mains 1 and mains 2 stages remain un-staged.

Fuel is communicated via the LP (low pressure) pump 10 to a fuel oil heat exchange (FOHE) 12 and a fuel flowmeter 14. Fuel is subsequently communicated from the fuel flowmeter to a HP (high pressure) pump 16, by which the fuel is pressurized to a suitably high pressure e.g. for injection into a combustor of a (gas) turbine engine. The HP pump 16 is preferably a device capable of varying the pressure of the pumped fuel. For example, the HP pump 16 may be controllable to pump fuel at a higher pressure when mains 1 is staged-in than when the system is in pilot mode as shown in FIG. 1, in which fuel is suitably pressurized so that it is injected into the combustor of the engine (not shown) via the or each pilot nozzle (not shown).

A hydromechanical unit (HMU) 18 is in fluid communication with the HP pump 16. The HMU 18 may be used to measure the flow of fuel (e.g. the rate of fuel flow) through it. In the present embodiment, the HMU 18 is arranged to measure the rate of fuel which is supplied to each staged-in stage. The HMU 18, therefore, can measure the fuel burn rate, and if desired can supply the fuel burn rate to the fuel burn control loop, i.e. the fuel metering control loop, (which for example, is a fuel burn control algorithm running on a computer).

Fuel is communicated from the HMU 18 to a splitter valve 20, and thereafter to the pilot fuel manifold 22, where the fuel is communicated to the or each pilot nozzle.

A pilot nozzle shut-off valve may be provided. The pilot nozzle shut-off valve may be adapted to open in response to a predetermined pressure difference between the pilot fuel manifold 22 and the pressure in the combustor, thereby allowing fuel to be controllably communicated from the pilot fuel manifold 22 to the or each pilot nozzle. A respective pilot nozzle shut-off valve may be provided for each pilot nozzle.

In pilot mode, fuel is also branched off from the fuel line communicating fuel from the HP pump 16 to the HMU 18 to be communicated to the splitter valve 20 and the staging valve 36 via respective flow restrictors 34 and 32. The splitter valve 20 communicates a portion of the branched off fuel to the mains 1 fuel supply manifold 24. The staging valve communicates a portion of the branched off fuel to the mains 2 fuel supply manifold 26.

A mains 1 nozzle shut-off valve (see FIG. 9) is provided to regulate the flow of fuel to a mains 1 nozzle. The mains 1 nozzle shut-off valve is adapted to open in response to a predetermined pressure difference between the mains 1 manifold 24 and the pressure in the combustor, thereby allowing fuel to be controllably communicated from the mains 1 manifold 24 to the or each mains 1 nozzle. Preferably, a respective mains 1 nozzle shut-off valve is provided for each mains 1 nozzle.

Likewise, a mains 2 nozzle shut-off valve (see FIG. 9) is provided to regulate the flow of fuel to a mains 2 nozzle. The mains 2 nozzle shut-off valve is adapted to open in response to a predetermined pressure difference between the mains 2 manifold 26 and the pressure in the combustor, thereby allowing fuel to be controllably communicated from the mains 2 manifold 26 to the or each mains 2 nozzle. Preferably, a respective mains 2 nozzle shut-off valve is provided for each mains 2 nozzle.

However, in pilot mode, the pressure of the fuel in the mains 1 and mains 2 manifolds 24, 26 is maintained below the crack pressure of the mains 1 and mains 2 nozzle shut-off valves.

Restrictors 34 and 32 are provided which, together with the HP pump 16 and pressure raising valves 38, 40, ultimately restrict the flow of, and regulate the pressure of, the branched off fuel in the mains 1 and mains 2 manifolds 24, 26. A respective recirculating conduit 28, 30 is also provided in each stage to recirculate the branched off fuel in each un-staged stage back to the fuel source. In the present embodiment, the or each recirculating conduit preferably recirculates fuel back to the fuel source via a controllable pressure regulating valves, e.g. a pressure raising valve 38 or 40 shown in FIGS. 1 to 4.

The pressure raising valves 38, 40 can be thought of as dynamic flow restrictors which vary the extent to which they restrict the flow of fuel in order to maintain the pressure in the respective manifold and recirculating conduit(s) within a certain range or at a set pressure.

Therefore, according to the present embodiment, in an un-staged stage, the pressure raising valves 38, 40, the restrictors 32, 34 and the HP pump can act cooperatively and synergistically to maintain the fuel pressure in the respective manifolds 24, 26 and recirculating conduits 28, 30 between the combustor pressure and the crack open pressure of the respective nozzle shut-off valves. Therefore, each recirculating conduit 28, 30 allows fuel in a respective un-staged stage to flow continuously, thereby preventing stagnation of fuel in the un-staged stage and also preventing coking of the fuel lines, such as the fuel supply manifold 24, 26 in the un-staged stage.

Rapid transitions between each staging mode with no adverse effect on engine operability is also achievable.

Furthermore, as a safety consideration, the combination of these features ensures that the fuel pressure in the un-staged stage remains above the combustor pressure (i.e. the pressure downstream of the or each nozzle), thereby preventing air ingress into the system via the or each nozzle.

The respective recirculating conduits 28, 30 return unused fuel from the mains 1 and mains 2 stages to an upstream part of the fuel supply system 1, preferably a part upstream of the HP pump 16 allowing the fuel to be suitably re-pressurized for subsequent communication to one or more fuel manifolds again.

The branched off fuel is preferably branched off prior to the HMU 18 so that the re-circulated fuel is not accounted for in the HMU metered fuel. Thus, in pilot mode, metered fuel is only communicated to the pilot manifold 22 for burning, whilst an unmetered restricted HP fuel supply is communicated to the or each unstaged manifolds 24, 26. The recirculated fuel is returned, e.g. via the HP pump inlet, to the fuel source to be mixed with the main fuel supply. Therefore, because only the burned fuel is metered, the recirculated fuel does not affect the fuel burn control loop.

Figure 2:
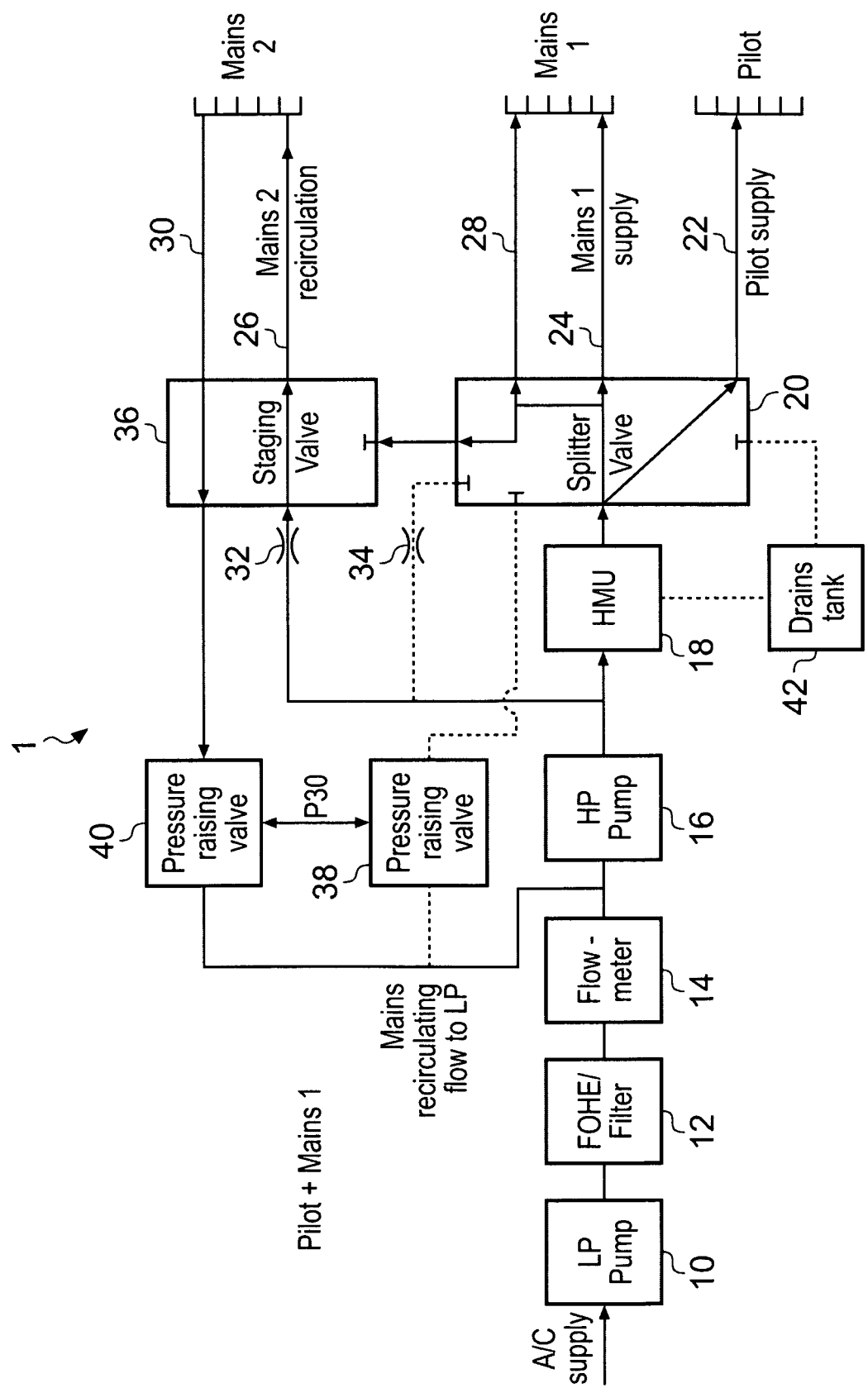
FIG. 2 shows a fuel supply system according to the present invention in pilot+mains 1 mode.

FIG. 2 shows the fuel supply system arrangement for a gas turbine engine in which both the pilot and mains 1 stages are staged-in (pilot+mains 1), i.e. both the pilot and mains 1 stages are required to communicate fuel to the combustor for burning.

In pilot+mains 1, the mains 1 manifold 24 is supplied with fuel pressurized by the HP pump 16 via the splitter valve 20 without passing via the restrictor 34. In the present embodiment, the splitter valve distributes the fuel supply between the mains 1 and the pilot stages depending on the desired output of the engine and other factors surrounding the pressure gradients in the system. Furthermore, the HP pump 16 may be controllable to increase the pressure of fuel supplied to the splitter valve.

Fuel may not be branched off and communicated separately to the splitter valve 20.

By virtue of not flowing via the restrictor 34 and pressure raising valve 38 and by virtue of the HP pump 16, the fuel in the mains 1 manifold 24 of the present embodiment is at a sufficiently high pressure to crack open the or each mains 1 nozzle shut-off valve and fuel can thus be injected to the combustor by the or each mains 1 nozzles.

Furthermore, as shown in FIG. 2, the mains 1 recirculating conduit 28 is preferably re-configured, e.g. by the splitter valve 20, to communicate fuel to the or each mains 1 nozzle shut-off valve in addition to the mains 1 manifold 24.

Thus, as mains 1 is staged-in, the fuel flow can be delivered to the or each mains 1 shut-off valve via both entry and exit lines (e.g. the mains 1 manifold 24 and the mains 1 recirculating conduit 28) to ensure that fuel flow is continuous.

The mains 2 recirculating conduit 30 is also re-configurable in a similar way, but in the case of mains 2 it is the staging valve 36 that preferably effects the re-configuration. However, any of the recirculating conduits 28, 30 could be configured in such a way by a suitable means for doing so, not necessarily the staging and/or splitter valves 36, 20.

Fuel communicated to the mains 1 stage and the pilot stage is metered by the HMU 18, and it is therefore possible to determine the fuel burn rate. The recirculated fuel again preferably bypasses the HMU 18 and in any case is not metered to be part of the metered burn fuel, so as not to adversely affect the fuel burn control loop.

Figure 3:
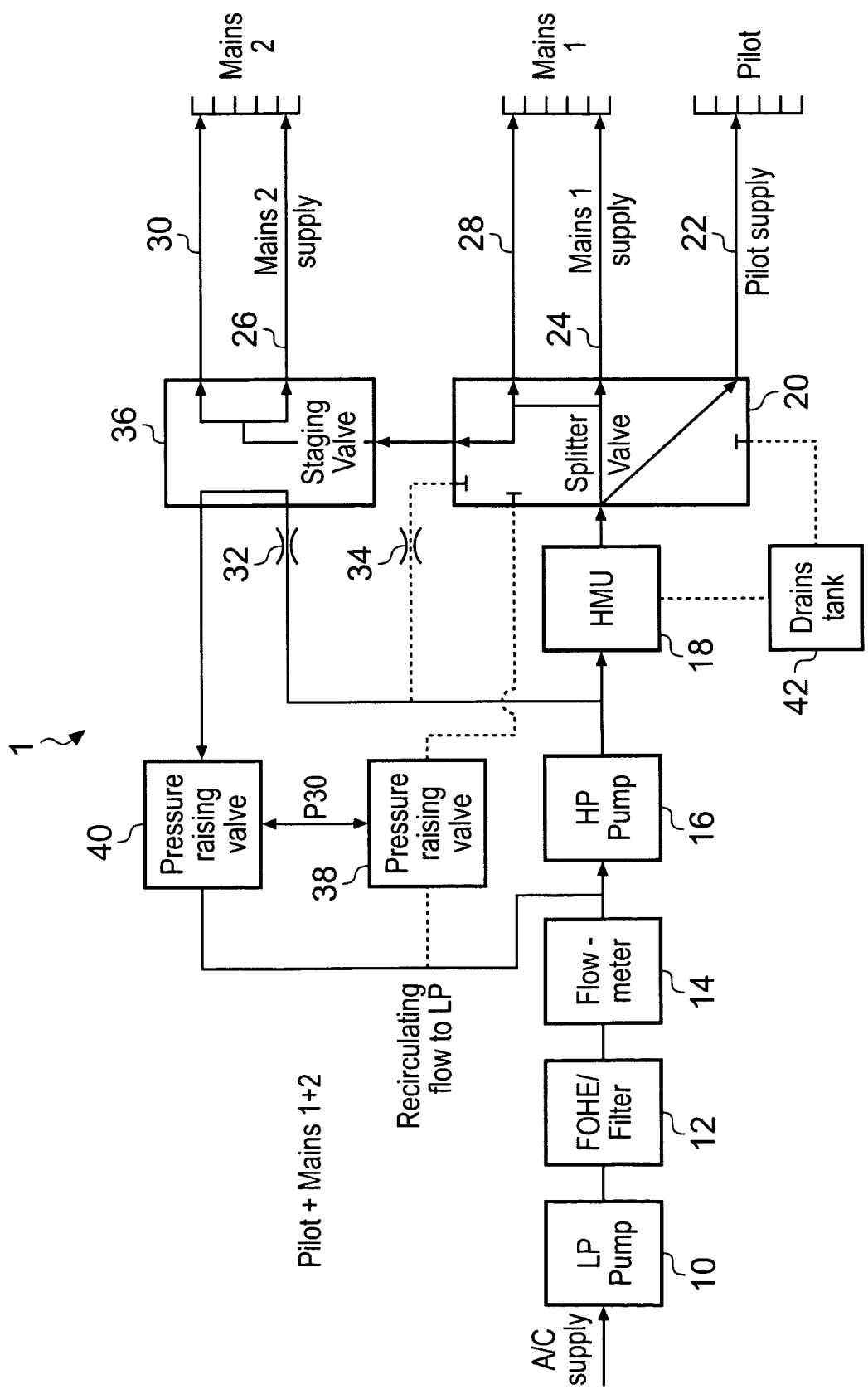
FIG. 3 shows a fuel supply system according to the present invention in pilot+mains 1+2 mode.

FIG. 3 shows the fuel supply system arrangement for a gas turbine engine in which the pilot, mains 1 and mains 2 stages are staged-in (pilot+mains 1+2).

When all these three stages are staged-in, in addition to the configuration described above for the pilot and mains 1 stages, pressurized fuel is communicated to the mains 2 stage via the splitter valve 20 and the staging valve 36 and the HMU 18, but without passing via the restrictor 32.

Again, the splitter valve 20 is controllable to determine the relative amount of fuel supplied to each of the stages.

The staging valve 36 communicates the pressurized fuel to the mains 2 fuel manifold 26. Furthermore, the staging valve 36 may re-configure the mains 2 recirculating conduit 30 to communicate fuel to the or each mains 2 nozzle shut-off valve (not shown). Therefore, fuel is not recirculated to the fuel source and does not flow via pressure raising valve 40.

When mains 2 is staged-in, the staging valve 36 may allow fuel to be branched off from the fuel supplied to the respective stages, preferably from upstream of the HMU 18, and may allow the fuel to be flowed in the staging valve, and/or the splitter valve, to prevent stagnation of fuel in the core pipes and valves, which are not used for supplying the high pressure fuel to the mains 2 stage for burning. However, the fuel is recirculated to the fuel source via the staging valve (and/or the splitter valve) without flowing via a manifold or a sub-system.

For example, as shown in FIG. 3, fuel may be allowed to flow through the restrictor 32, the staging valve 36 and the pressure raising valve 40 and thereafter to be returned to an upstream portion of the fuel supply system, e.g. at a point in the system upstream of the HP pump 16. In the present embodiment this is important because it is envisaged that the staging valve will be located in a hot zone of a turbine engine. However, it is not necessary to locate the staging valve 36 in a hot zone of a turbine, and therefore this additional re-circulation may not be necessary in such an arrangement.

In any case, again only fuel intended for burning in the combustor is metered, e.g. by the HMU 18, and used in the fuel burn control loop.

Figure 4:
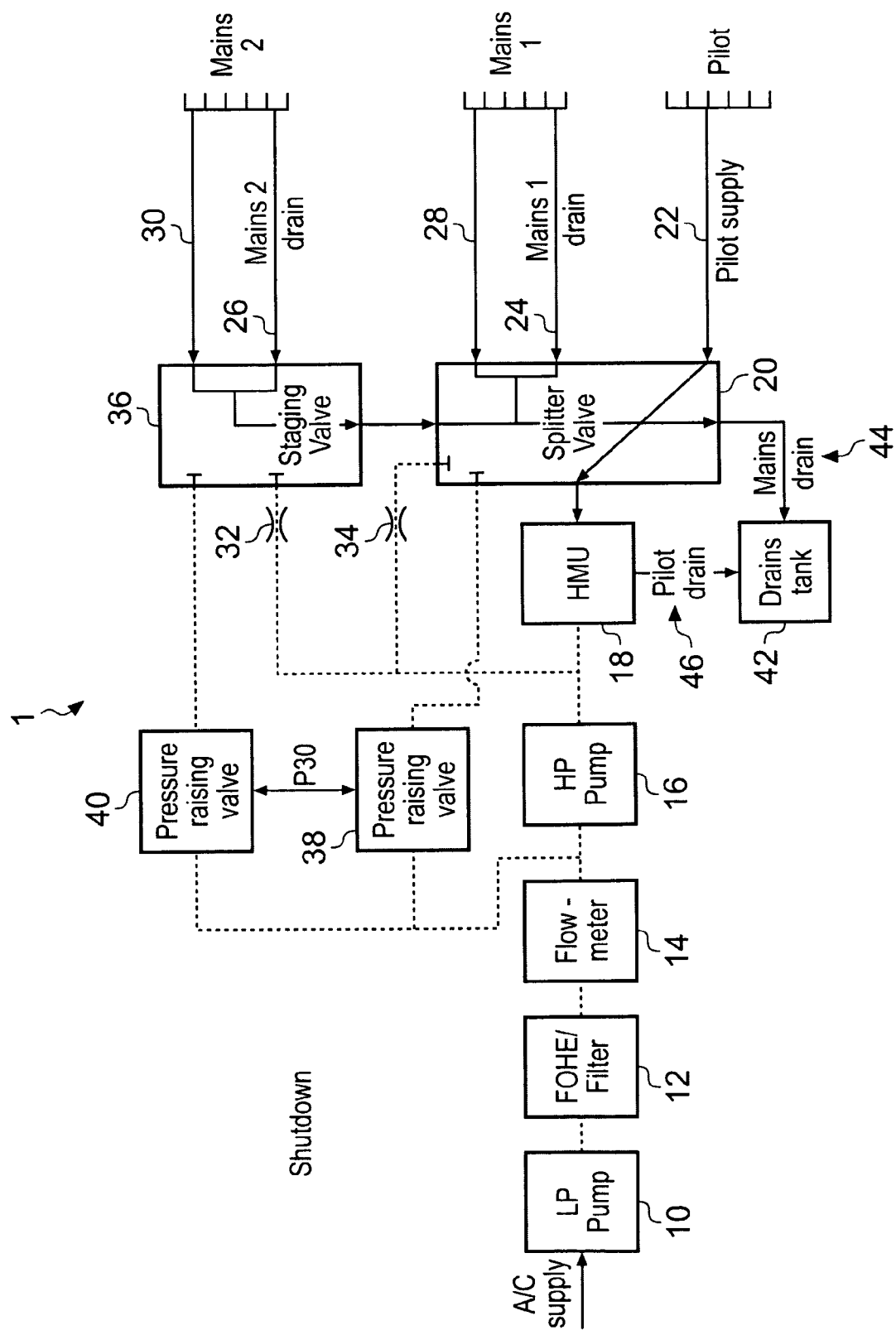
FIG. 4 shows a fuel supply system according to the present invention in shutdown mode.

A shutdown configuration of the fuel supply system 1 is shown in FIG. 4. Prior to shutdown, the system will be configured similar to that shown in FIG. 1, i.e. it will normally be in pilot mode. On shutdown, the mains 1 and mains 2 manifolds are re-configured to allow fuel to communicate from the or each mains 1 and mains 2 nozzle shut-off valves, e.g. via the splitter and staging valves 20, 36, to a drains tank 42 (e.g. in addition to the recirculating conduit(s)). In the present embodiment the staging valve 36 allows the communication of fuel from the mains 2 manifold 26, and the mains 2 recirculating conduit 30, to the splitter valve. The splitter valve 20 allows the communication of fuel from the mains 1 manifold 24, and the mains 1 recirculating conduit 28, as well as the communication of fuel from the staging valve 36, to the drains tank 42 via a mains drain 44.

Fuel from the pilot stage is drained from the pilot fuel manifold 22 to the drains tank via the pilot drain 46. The pilot fuel may be drained via the HMU 18 in order that the fuel supplied to the (previously staged) pilot stage can be accounted for in the fuel metering control loop. There may be no need to determine the amount of fuel in the un-staged mains 1 and mains 2 stages, because it is preferably not accounted for in the fuel metering control loop.

From above, it can be seen that e.g. in pilot mode, a pair of recirculating conduits 28, 30 can be provided in a "parallel" connection configuration with a fuel source.

In an alternative embodiment according to the present invention, recirculating conduits can be provided in a "series" connection configuration with the fuel source.

Figure 5:
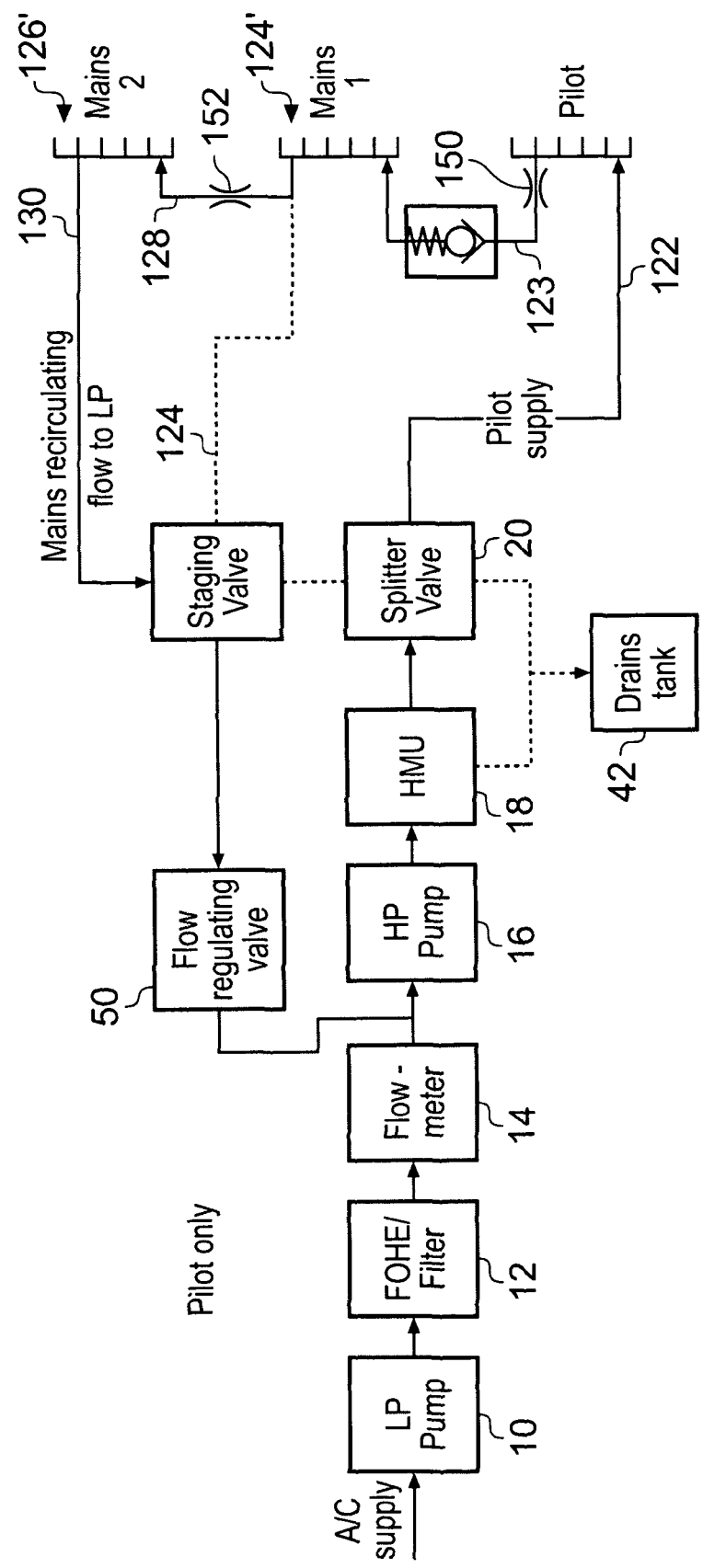
FIG. 5 shows a fuel supply system according to the present invention in pilot mode.

FIG. 5 shows such an embodiment in pilot only mode, i.e. where only the pilot stage is staged-in. The arrangement of the core of the fuel supply system up to the splitter valve 20 is similar to the embodiment discussed above, except that fuel is not branched off to be supplied to the mains 1 and mains 2 stages. Rather, all the fuel is communicated to the pilot fuel manifold 122 so that at least a portion of the fuel can be injected into the combustor via the or each pilot nozzle. Again, a pilot nozzle shut-off valve may be provided, as described above. A respective pilot nozzle shut-off valve for each pilot nozzle may be provided.

However, preferably not all of the fuel flowing through the pilot manifold 122 is injected into the combustor via the pilot nozzle. Some of the fuel is communicated to a portion of the mains 1 fuel manifold 124' via a pilot recirculating conduit 123. The conduit 123 preferably includes a restrictor 150, or other means, for restricting the flow of fuel to the mains 1 manifold portion 124'. Nonetheless, fuel is able to flow from the pilot stage to the mains 1 stage.

Furthermore, in the present embodiment, the mains 1 stage (e.g. the mains 1 manifold 124') is in fluid communication with a portion of the mains 2 fuel manifold 126' via a mains 1 recirculating conduit 128. The recirculating conduit 128 may also include a restrictor 152, or other means, for restricting the flow of fuel.

A mains 2 recirculating conduit 130 allows communication of fuel from the mains 2 fuel manifold 126, 126' to an upstream part of the fuel supply system, e.g. a part upstream of the HP pump 16. Preferably, the conduit 130 is in fluid communication with such an upstream part via the staging valve 36.

Similarly to that described above, the continuous flow, in use, of fuel through the respective stages prevents coking of the lines and allows for rapid transition between staging modes.

The conduit is in fluid communication with such an upstream part via a flow regulating valve 50. The flow regulating valve 50 preferably passes a fixed fuel flow thereby regulating the fuel flow rate in the or each recirculating conduit. The restrictor 150, or other means, preferably inhibits the pressure of the fuel communicated from the pilot manifold 122 to the mains 1 manifold 124' from exceeding the crack pressure of the or each mains 1 nozzle shut-off valve, thereby ensuring that the mains 1 nozzle shut-off valve is not erroneously cracked open in pilot mode. The restrictor 152 may similarly reduce the pressure of fuel communicated by it.

So, in contrast to the first embodiment described above, the flow rate of the re-circulated fuel is maintained at a set level rather than the pressure of the re-circulated fuel. This is so that the fixed flow rate can be subtracted, e.g. by software running on computer, from the metered flow (as measured by e.g. the HMU) to determine the fuel burn rate.

One or more of the recirculating conduits may include a non-return valve 150 arranged to prevent back flow of fuel, e.g. from a higher order stage (e.g. mains 1) to a lower order stage (e.g. pilot).

Figure 6:
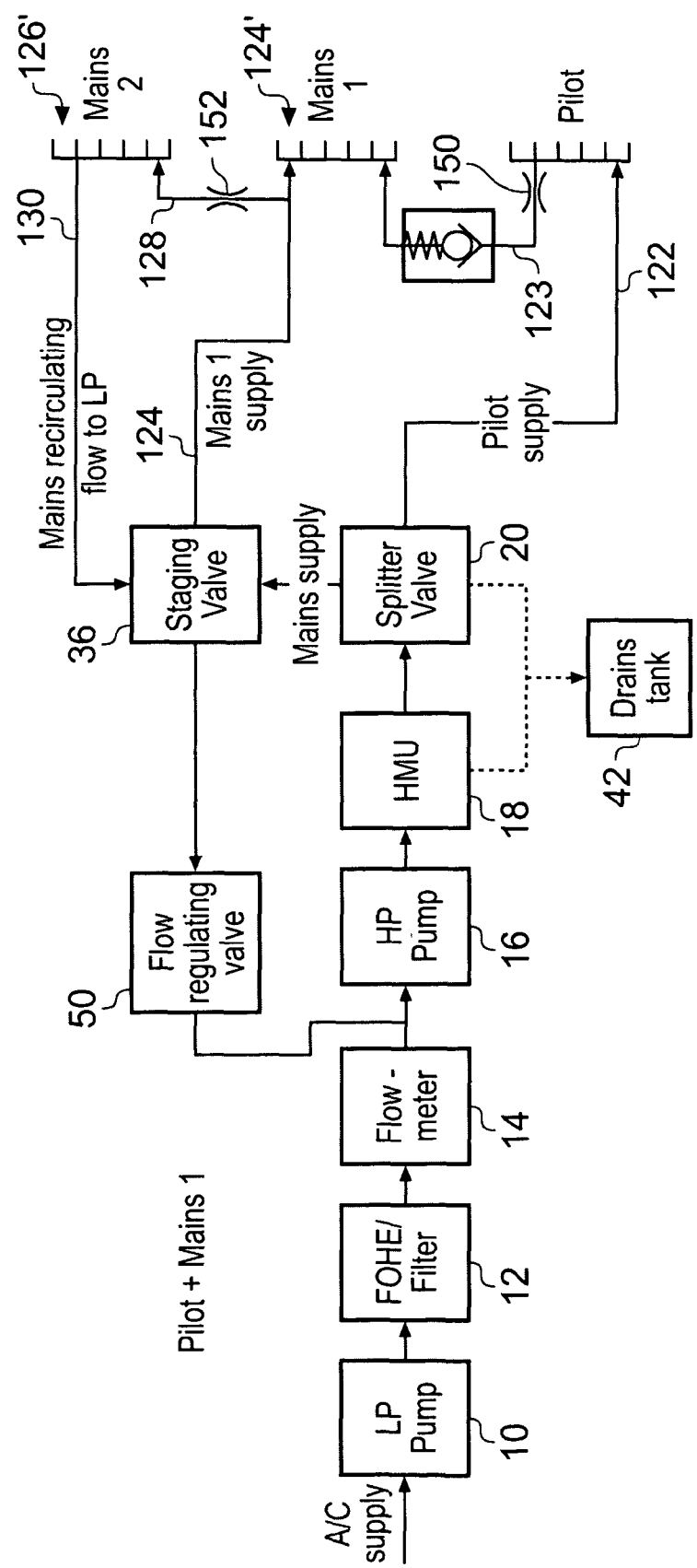
FIG. 6 shows a fuel supply system according to the present invention in pilot+mains 1 mode.

When the mains 1 stage is staged-in, as shown in FIG. 6, the splitter valve 20 supplies the staging valve 36 with pressurized fuel, and the staging valve 36 switches to communicate the pressurized fuel via the mains 1 manifold 124 to the or each mains 1 nozzle shut-off valve (not shown). The pressure of the fuel communicated by the staging valve 36 can be set sufficiently high by the cooperation of the HP pump 16, the restrictor 150 and/or 152 and the flow regulator 50 to crack open the or each mains 1 nozzle shut-off valve. Cooperation of these elements also ensures that the mains 2 nozzle shut off valves do not crack open in pilot+mains 1 mode.

The fuel for burning in the combustor is metered, but again any fuel supplied to the staging valve and/or the splitter valve only for cooling down either or both of these valves is preferably not metered to be included in the fuel burn control loop.

Figure 7:
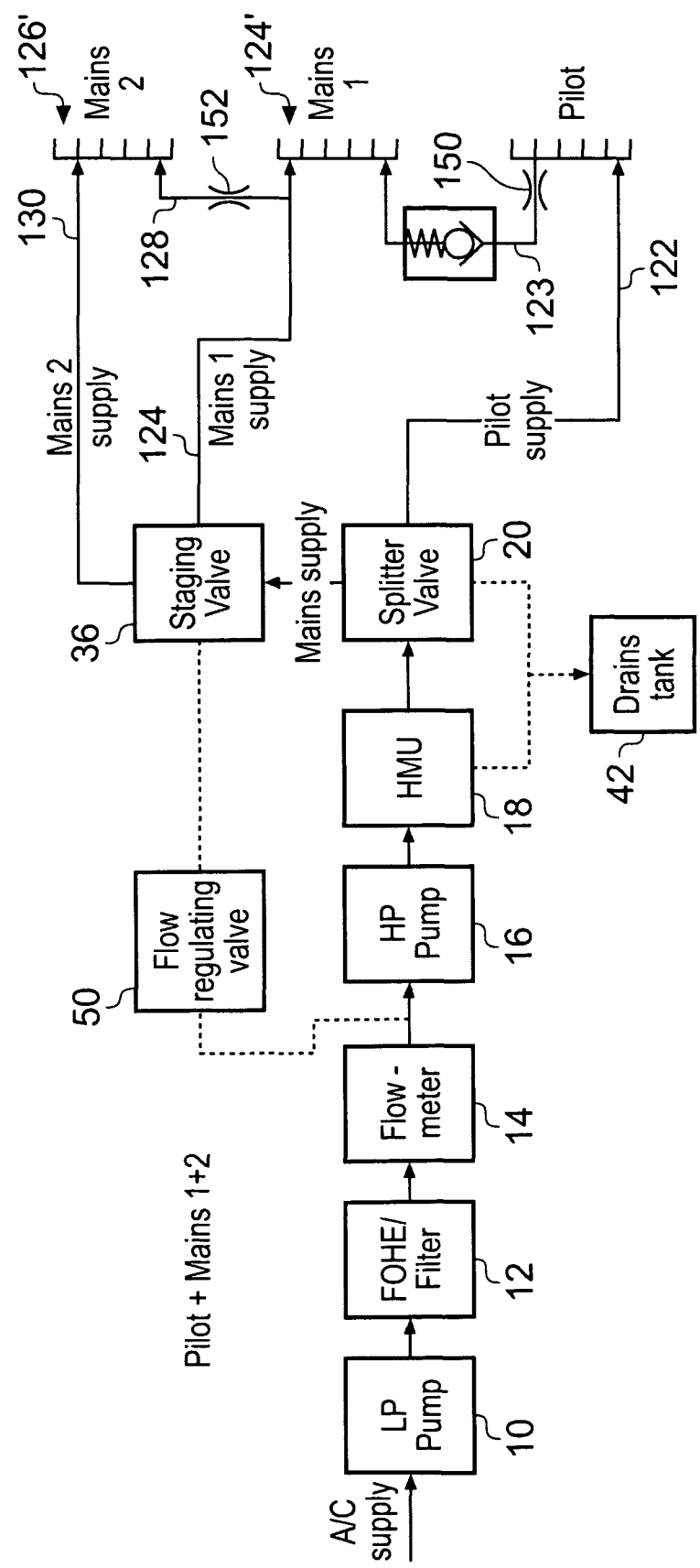
FIG. 7 shows a fuel supply system according to the present invention in pilot+mains 1+2 mode.

However, when the mains 2 stage is staged-in, as shown in FIG. 7, the splitter valve 20 is already supplying the staging valve 36 with pressurized fuel, but the staging valve 36 further switches to communicate some of the pressurized fuel via the mains 2 recirculating conduit 130 to the or each mains 2 nozzle shut-off valve (not shown). The pressure of the fuel communicated by the staging valve 36 is set sufficiently high by the HP pump 16 to crack open the or each mains 2 nozzle shut-off valve.

Figure 8:
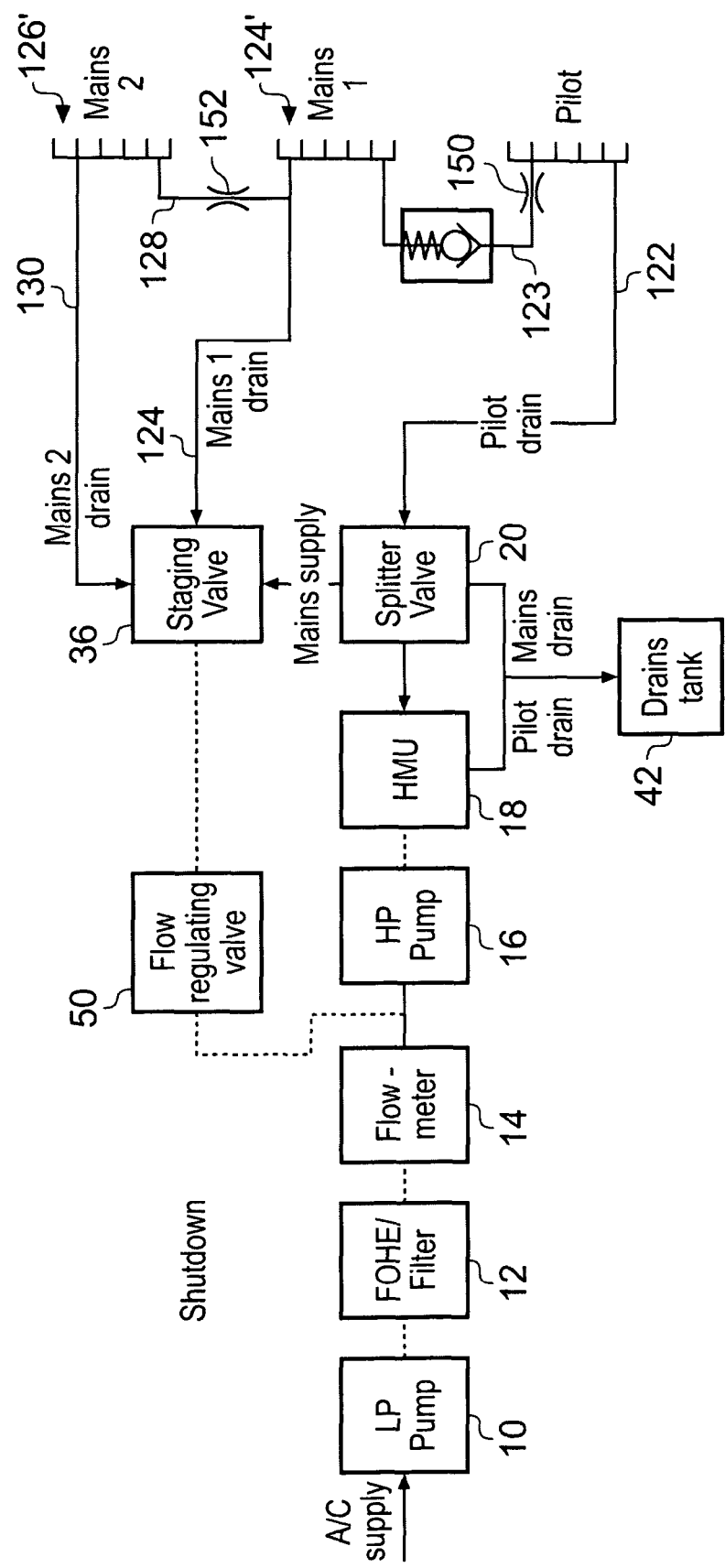
FIG. 8 shows a fuel supply system according to the present invention in shutdown mode.

At shutdown, see FIG. 8, the staging valve 36 switches again to allow fuel to be communicated from the mains 1 and 2 stages to the splitter valve 20 via the mains drain (as shown in FIG. 8). The splitter valve 20 is arranged, during shutdown, to communicate the mains fuel to the drains tank 42 via the mains drain 44 whilst circumventing the HMU 18. This is because, prior to a shutdown the system will be in pilot mode, and the HMU 18 and the flow regulating valve 50 will be configured to determine the fuel burn rate. However, the splitter valve 20 communicates fuel from the pilot stage to the drains tank 42 via pilot drain 52 and the HMU 18, because it is preferable to determine the volume of returned fuel that has been accounted for in the burn rate on the basis of the metering performed by the HMU 18 and the flow regulating valve 50.

Figure 9:
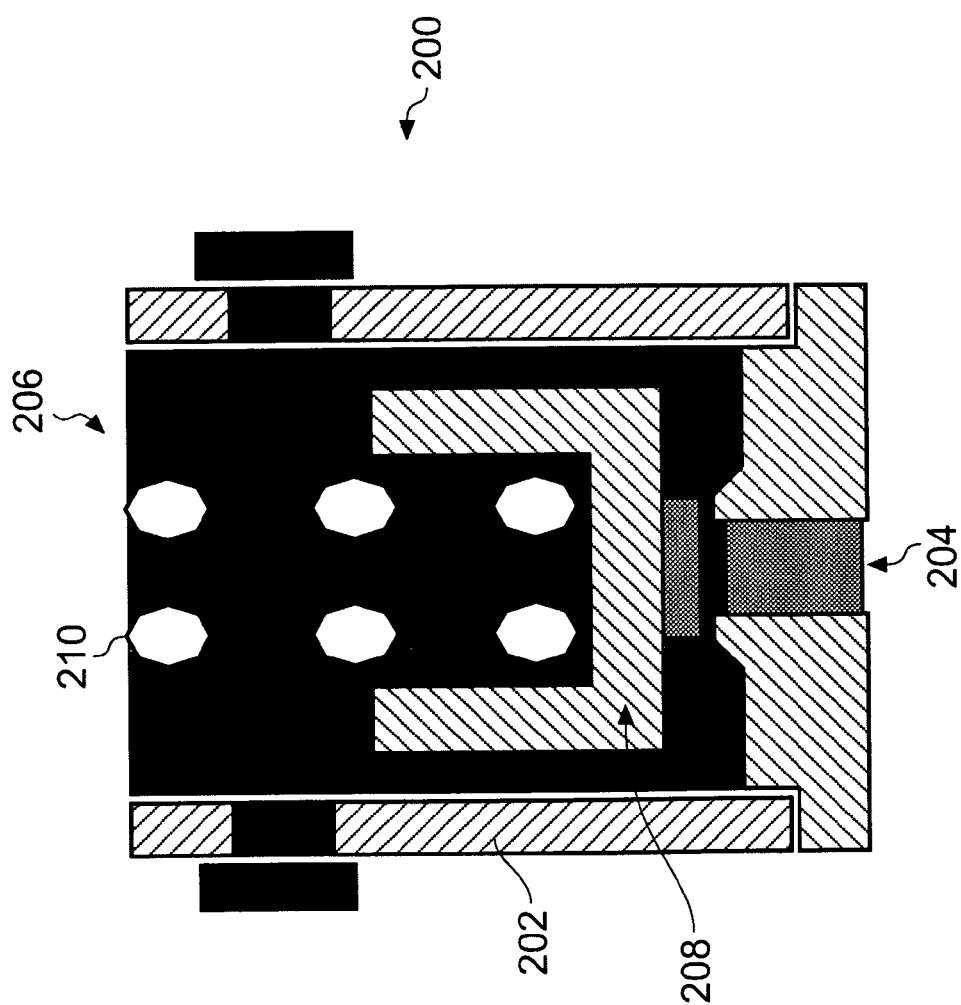
FIG. 9 shows a sectional view of a nozzle shut-off valve as may be included in a fuel supply system according to the present invention.

FIG. 9 shows an example of a nozzle shut-off valve according to the present invention. The valve 200 is a one-way valve, in that it allows fluid to flow through it in one direction only. The valve 200 includes a valve housing 202 having an inlet 204 and an outlet 206. When the valve 200 is open, fuel can flow through the inlet 204 to the outlet 206 under guidance of the housing 202.

The valve 200 also includes a stop member 208 for forming a seal with the housing 202, e.g. the inlet 204, to prevent the flow of fluid through the housing 202. A biasing member 210, in this case a spring such as a helical spring, urges the stop member to form the seal with the housing 202. The biasing member 210 may be rigidly coupled to the housing 206, either directly or indirectly.

The valve 200 is openable by increasing the pressure external to the inlet 204 so that the force on the stop member exceeds the force exerted on the stop member 208 resulting from the urging force of the biasing member 210 and the pressure at the outlet 206.

According to the present invention, the valve 200 will crack open, i.e. the valve housing 202 will put the fuel supply manifold in fluid communication with an injector nozzle for injecting fuel into a combustor of a turbine engine, when the force on the stop member 210 resulting from the fuel pressure in the fuel supply manifold exceeds the force on the stop member 210 resulting from the pressure in the combustor and the force of the biasing member 210.

Advantageously, the embodiment shown in FIG. 9 also fails-safe should the fuel pressure on the inlet side of the valve 200 drop below the combustor pressure, thereby ensuring that air does not enter the fuel supply system, because it is a one-way valve. A two-way valve could be used if desired, though.

In general, the respective nozzle shut-off valves of the mains 1 and mains 2 stages may have higher crack pressures than the pilot stage if one or more pilot nozzle shut-off valves are provided. Furthermore, the mains 2 stage may have a higher crack pressure than the mains 1 stage. Therefore, to stage-in the mains 1 and mains 2 stages, the pressure of the fuel in the respective manifolds is controlled to increase to above the respective crack pressure of the mains 1 and mains 2 nozzle shut-off valves.

The splitter valve 20 is preferably a valve which, in use, is continuously variable to distribute fuel between respective manifolds and/or the staging valve 36. The splitter valve 20 may be included in the controller assembly, or it may be controllable by the controller assembly. The staging valve 36 is preferably a valve which operates as an on-off switch, and which preferably therefore changes the number of mains burners fed by the mains fuel metered and distributed by e.g. the HMU 18 and the splitter valve 20.

In the specific embodiments described above, the splitter valve 20 is assumed to be in a cool zone of a turbine to which the fuel supply system according to the present invention is applied. However, as discussed it also assumed that the staging valve 36 is in a hot zone. Therefore, as shown in e.g. FIG. 3, fuel is allowed to circulate through the staging valve 36 from the fuel source to the pressure raising valve 40 and returned to the fuel source to prevent stagnation of fuel. Of course, fuel is allowed to flow through the staging valve 36 to the mains 2 manifold 26 and to the mains 2 recirculation conduit 30, so the stagnation of fuel in the burner-side lines and pipes of the staging valve 36 is also avoided.

Turning back to the splitter valve 20, if the splitter valve 20 is located in a hot zone of the turbine, it may be necessary to allow fuel to flow through the core-side pipes and lines to prevent stagnation and high temperature fuel degradation. For example, the splitter valve 20 may allow fuel to flow via the restrictor 34 and/or via the line in fluid communication with the pressure raising valve 38 in addition to allowing fuel to flow to the or each fuel manifold and/or the staging valve 36.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All the references mentioned herein are incorporated by reference.

What is claimed is:

1. A turbine fuel supply system including a first sub-system having:
   a first nozzle for injecting fuel into a combustor of a turbine engine;
   a first valve controllable to communicate fuel to the first nozzle;
   a first fuel manifold for communicating fuel to the first valve from a fuel source; and
   a first recirculating conduit in fluid communication with the first fuel manifold and the fuel source, the first recirculating conduit allowing fuel not communicated by the first valve to be returned to the fuel source,
   wherein the first recirculating conduit is located downstream from the first valve,
   the system further including a controller assembly for raising the pressure of fuel in the first fuel manifold; and the system being characterized in that
   the first valve is adapted to open in direct response to a crack pressure predetermined by a pressure difference between a varying pressure in the first fuel manifold and the pressure in the combustor, thereby allowing fuel to be communicated from the first fuel manifold to the first nozzle.

2. A turbine fuel supply system according to claim 1, further including a second sub-system having:
- a second nozzle for injecting fuel into the combustor of the turbine engine;
- a second valve controllable to communicate fuel to the second nozzle; and
- a second fuel manifold for communicating fuel to the second valve from the fuel source; wherein
- the controller assembly is capable of raising the pressure of fuel in the second fuel manifold; and wherein
- the second valve is adapted to open in direct response to a crack pressure predetermined by a pressure difference between a varying pressure in the second fuel manifold and the pressure in the combustor, thereby allowing fuel to be communicated from the second fuel manifold to the second nozzle.

3. A turbine fuel supply system according to claim 2, further including
- a second recirculating conduit in fluid communication with the second fuel manifold and the fuel source, the second recirculating conduit allowing fuel not communicated by the second valve to be returned to the fuel source.

4. A turbine fuel supply system according to claim 2 further including:
- a second recirculating conduit in fluid communication with the second fuel manifold and the fuel source, the second recirculating conduit allowing fuel not communicated by the second valve to be returned to the fuel source;
- wherein the first recirculating conduit is in fluid communication with the fuel source via the second recirculating conduit.

5. A turbine fuel supply system according claim 4, wherein the second fuel manifold includes the first fuel manifold and the first recirculating conduit.

6. A turbine fuel supply system according claim 4, further including a primary sub-system having:
- a primary nozzle for injecting fuel into the combustor of the turbine engine;
- a primary valve controllable to communicate fuel to the primary nozzle; and
- a primary fuel manifold for communicating fuel to the primary valve from the fuel source; wherein
- the controller assembly is capable of raising the pressure of fuel in the primary fuel manifold; and wherein
- the primary valve is adapted to open in direct response to a predetermined pressure difference between the primary fuel manifold and the pressure in the combustor, thereby allowing fuel to be communicated from the primary fuel manifold to the primary nozzle.

7. A turbine fuel supply system according to claim 6, further including:
- a primary recirculating conduit in fluid communication with the primary fuel manifold and the fuel source, the primary recirculating conduit allowing fuel not communicated by the primary valve to be returned to the fuel source;
- wherein the primary recirculating conduit is in fluid communication with the fuel source via a sequence of the first and second recirculating conduits.

8. A turbine fuel supply system according to claim 7 wherein the first fuel manifold includes the primary fuel manifold and the primary recirculating conduit.

9. A turbine fuel supply system according to claim 4, wherein the first recirculating conduit puts the first fuel manifold in fluid communication with the second fuel manifold.

10. A turbine fuel supply system according to claim 4 further including a flow regulator for maintaining a set flow rate for the recirculated fuel.

11. A turbine fuel supply system according to claim 4, further including a second flow meter for determining the rate of flow of fuel in the first manifold or the second manifold or both.

12. A turbine fuel supply system according to claim 11 wherein the second flow meter determines the fuel flow rate in the respective manifold of each staged sub-system only.

13. A turbine fuel supply system according to claim 6, wherein said primary nozzle forms a portion of a pilot stage of the system.

14. A turbine fuel supply system according to claim 2, wherein said second nozzle forms a portion of a second mains stage of the system.

15. A turbine fuel supply system according to claim 1 further including a measurement assembly for determining the flow rate of fuel communicated to the fuel manifold of the staged-in sub-system.

16. A turbine fuel supply system according to claim 1, wherein the first recirculating conduit includes a restrictor for restricting fuel flow.

17. A turbine fuel supply system according to claim 1, further including a first meter for determining the rate of flow of fuel returned to the fuel source.

18. A turbine fuel supply system according to claim 1, wherein the first recirculating conduit includes a non-return valve.

19. A turbine fuel supply system according to claim 1, further including a drain conduit for communicating, in response to a shutdown of the turbine, fuel from the fuel manifold to a drains tank.

20. A turbine fuel supply system according to claim 1, wherein said first nozzle forms a portion of a first mains stage of the system.

21. A turbine engine including the turbine fuel supply system according to claim 1.

22. An aeroplane including the turbine fuel supply system according to claim 1.

* * * * *